United States Patent
Agrawal et al.

(10) Patent No.: US 9,235,758 B1
(45) Date of Patent: Jan. 12, 2016

(54) ROBUST METHOD TO FIND LAYOUT SIMILARITY BETWEEN TWO DOCUMENTS

(71) Applicant: Adobe Systems Incorporated, San Jose, CA (US)

(72) Inventors: Ram Bhushan Agrawal, Noida (IN); Akhilesh Godi, Hyderabad (IN); Ankush Das, Faridabad (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/318,890

(22) Filed: Jun. 30, 2014

(51) Int. Cl.
  *G06K 9/34* (2006.01)
  *G06K 9/00* (2006.01)
  *G06T 7/00* (2006.01)

(52) U.S. Cl.
  CPC ........ *G06K 9/00463* (2013.01); *G06K 9/00483* (2013.01); *G06T 7/0081* (2013.01); *G06T 2207/20021* (2013.01); *G06T 2207/30176* (2013.01)

(58) Field of Classification Search
  None
  See application file for complete search history.

(56) References Cited

U.S. PATENT DOCUMENTS 8,831,361 B2 * 9/2014 Pintsov .......................... 382/224
2004/0220898 A1 * 11/2004 Eguchi et al. .................... 707/1

* cited by examiner

*Primary Examiner* — Phuoc Tran
(74) *Attorney, Agent, or Firm* — Kilpatrick Townsend & Stockton LLP

(57) ABSTRACT

Techniques for comparing documents may be provided. For example, a comparison between layouts of the documents may be performed. The comparison may include segmenting the documents into blocks, where an arrangement of blocks of a document represents a layout of the document. Once segmented, similarity metrics, such as distances, between blocks of one document and blocks of the other document may be computed. The similarity metrics may be used to match the blocks between the documents. Further, the similarity metrics between the matched blocks may be added to determine an overall similarity metric between the documents. This overall similarity metric may indicate how similar the documents may be.

20 Claims, 9 Drawing Sheets

ROBUST METHOD TO FIND LAYOUT SIMILARITY BETWEEN TWO DOCUMENTS

TECHNICAL FIELD

This disclosure relates generally to techniques for comparing documents.

BACKGROUND

Document similarity is a topic that has been studied extensively for decades in the field of information retrieval and for data engineering. Document similarity techniques commonly involve comparing a pair of documents to determine how related the two may be. The similarity of documents has been determined based on the similarity of text and images or other content and based on the similarity of the layouts of the documents.

Comparing layouts typically allows determining that two documents are similar regardless of how the content may or may not match. Determining how similar the layouts of documents are to one another has various applications. For example, phone bills issued to a subscriber from a same company generally have a same layout but differ in content from one month to the next. Although a content similarity analysis can result in a finding of dissimilarity, a layout similarity can identify that two phone bills are related. As such, if the subscriber is more interested in finding whether two documents are phone bills rather than whether the phone bills are for the same month, the layout similarity analysis may provide a good solution.

Further, a layout similarity analysis can be performed using a low-level representation or a high-level representation of the compared documents. An example of the former representation includes comparing bit maps of the documents. Although easy to compute, this type of representation does not capture the inherent layouts of the documents and, thus, can be inaccurate. An example of the latter representation includes partitioning the documents into portions of M rows and N columns (M and N being integers) and comparing equivalent portions, such as the top-left portion of one document to the top-left portion of another document. The comparison involves assessing an amount of pixel area in each of the portions (e.g., total amount of text, image, etc. in the top-left portions). However, this type of representation can also lead to inaccurate results. For example, although two phone bills may have a similar layout, the pixel area within each portion may change from one month to the next (e.g., if the top-left corner represents a list of calls made in a month, that list can be blank—no calls—in one month and can be full—a large volume of calls—in the next month). In another example, two magazine pages may have a similar layout but an image may be found in the top-left corner in one magazine and in the top-right corner in the other magazine. In both examples, a layout analysis using a high-level representation can incorrectly result in a dissimilarity finding.

SUMMARY

One exemplary embodiment involves segmenting documents into blocks. Each of the blocks can represent a contiguous portion of a document. The arrangement of the blocks on each document can represent a layout of the document. Additionally, the exemplary embodiment involves computing distances between the blocks across the documents. The distances can numerically represent how similar blocks of one document are to blocks in the other document. The smaller the distances are, the more similar the blocks may be. The computation can include selectively comparing certain blocks from one document to certain blocks in the other document to improve the accuracy of the overall document similarity. Further, the exemplary embodiment involves matching blocks between the documents. For example, blocks can be matched such that the total distance between the blocks is optimized (e.g., minimized). Further, the exemplary embodiment involves computing a distance between the documents. This distance can represent how similar the layouts of the documents are to one another. The distance between the documents can be computed by combining or otherwise based on the computed distances between the matched blocks. For example, the total distance between the matched blocks can be set as the distance between the documents.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
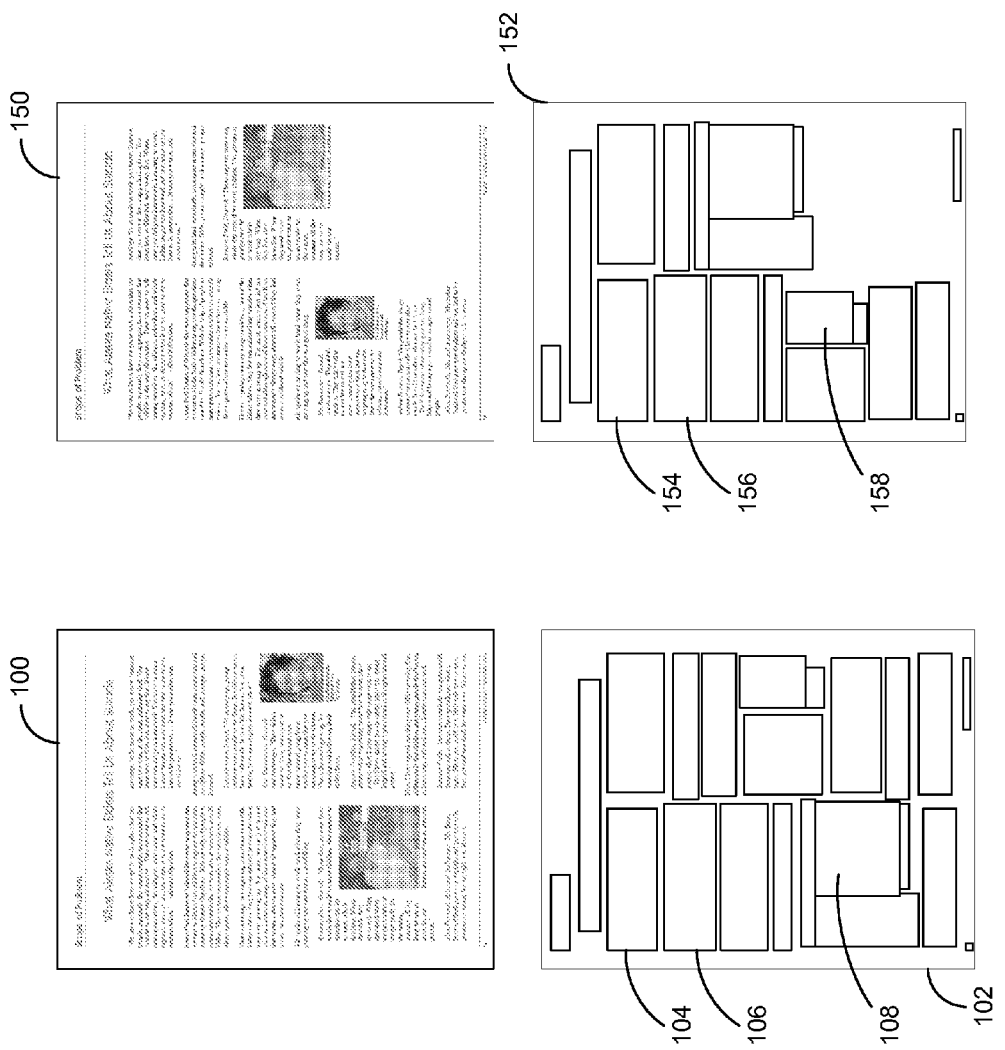
FIG. 1 illustrates example layouts of documents for comparison, according to certain embodiments of the present invention.

Specific details of various exemplary embodiments of the present invention are set forth in the following description and are illustrated in FIGS. 1-8. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

Methods and systems for comparing layouts of documents are disclosed. The methods and systems use a computer application to segment two document into blocks with each block encompass a particular portion (one image, one paragraph, one title, etc.) and compare the size and/or position attributes of the blocks of one document to the size and/or position attributes of the blocks of the other document to determine the similarity of the layout of the two documents. This block-based comparison approach improves the determination of document layout similarity because, unlike prior techniques, it better accounts for similarities in the sizes and positions of paragraphs, images, and other particular document portions. Each block may be selected to encompass a particular portion of a document. For example, the text of a paragraph may be identified as all relating the same paragraph and a block can be selected to encompass the paragraph based on that determination. As additional examples, one block may encompass an image, another block may encompass a title, another block may encompass a single line of text that is graphically set apart from other text, etc. Each block thus represents a respective contiguous portion of the document that includes information associated by a relation.

In an illustrative example, the application may be implemented in a client-server environment. A client can send the server a request to compare documents. In turn, the server receives the request, executes the application to compare the layouts, and responds with an indication of the similarity. The response may include various indications. For example, a qualitative assessment (e.g., good similarity) or a quantitative (e.g., 95% similar) is provided. In another example, the layout similarity is used to cluster the documents in a cluster and an identification of the cluster is provided.

To improve the accuracy of the layout comparison, the application is configured to distinguish between various types of information in the documents. For example, the application can distinguish between text and non-text blocks in the documents. This distinction allows the application to match, as best as possible, text blocks in the first document to text blocks in the second document and, likewise, non-text blocks in the first document to non-text blocks in the second document. Further, the application is configured to assess the overall similarity based on the matched blocks. As such, text blocks are compared to matched text blocks and non-text blocks are compared to matched non-text blocks. To illustrate, and returning to the previous magazine example with images on opposite sides, the application can match a non-text block containing the image in the top-left corner of the first magazine to a non-text block containing the image of the top-right corner in the second magazine. As such, whereas prior techniques would incorrectly find that the magazines have different layouts, the application can still determine that the layouts are similar, thereby improving the accuracy of the comparison.

In an embodiment, the application segments a document into blocks based on various block types. For example, the application may divide the document into text blocks (e.g., paragraphs, headers, footers or other blocks) and non-text blocks (e.g., images, tables, charts, or other blocks). A block represents a geometric shape, such as a rectangle, that minimally bounds a portion of the document based on the respective block type. For example, an image block may be a minimum bounding rectangle that contains an image. In comparison, two paragraphs may be bounded in two paragraph blocks. The collection of the blocks represents a layout of the document. For example, a document that contains a header, three paragraphs, and two images may be represented by a layout that includes a header block, three paragraph blocks, and two image blocks.

Next, to compare the document to another document, the application measures similarity metrics between the blocks of the document and blocks of the other documents. An example similarity metric includes a distance, as further described herein below. In general, a distance between two blocks can indicate how similar the two blocks may be. In an embodiment, the smaller the distance is, the greater the similarity may be.

Generally, the similarity metrics (e.g., distances) are measured per block type. In other words, the application measures the similarity metrics between text blocks (e.g., paragraph blocks) separately from the similarity metrics between non-text blocks (e.g., image blocks). This computation is performed to match text blocks to text blocks and non-text blocks to non-text blocks such that the similarity metrics are optimized. For example, the matching can minimize the total distance between the blocks. If certain blocks could not be matched, the application measures the similarity metrics between unmatched blocks of different types (e.g., between an unmatched text block and an unmatched non-text block) or assesses a penalty.

Once the blocks are matched and the penalties are assessed, the application measures an overall similarity metric (e.g., a distance) between the documents based on the similarity metrics between the matched blocks and based on the penalties. In an embodiment, the overall similarity metric is a function of the similarity metrics and penalties. For example, the distance between the documents can include a sum of the distances between the matched blocks and of the assessed penalties.

Further, the application compares the overall similarity metric to a predefined threshold to determine whether the documents should be found similar or not. For example, if the distance between the two documents is smaller than a certain threshold, the application can indicate that the documents are similar.

These illustrative examples are given to introduce the reader to the general subject matter discussed here and are not intended to limit the scope of the disclosed concepts. The following sections describe various additional embodiments and examples with reference to the drawings in which like numerals indicate like elements.

Turning to FIG. 1, that figure illustrates example layouts of documents. In an embodiment, an application, such as the layout comparison application 718 of FIG. 7 or 804 of FIG. 8, is executed to compare a document 100 and a document 150. The comparison includes comparing the layouts 102 and 152 of the documents 100 and 150.

As used herein, the term "document" refers to an electronic document that contains any delineable unit of information. In an example, a document may contain one or more pages. Comparing such documents involves comparing the respective pages or a set of the respective pages (e.g., the cover page in each of the documents). A page of a document may include various types of information such as text and non-text information. Text can be grouped in text blocks such as in paragraph, header, footer, and other text-blocks. In comparison, non-text (e.g., images) can be grouped in image, graph, table, and other non-text blocks. The blocks in a page can constitute a layout of the page.

As used herein, a "layout" refers to the way in which portions of a document are arranged. In an embodiment, a document is segmented into blocks, and the arrangement of the blocks represents the layout of the document. Techniques for segmenting a document into blocks are further described in FIGS. 6 and 7.

As used herein a "block" refers to a contiguous portion of a document bounded by a geometric shape. The geometric shape need not itself be part of the document. A block may be characterized by a block type. The geometric shape can be set as a minimum bounding shape that contains one or more types of information associated by a certain relation. Example geometric shapes include rectangles, squares, triangles, circles, polygons, etc. Example types of information include text, images, tables, etc. Example relations include text in one paragraph, pixels of a single image, a title and pixels of an image, etc. As such, a single geometric shape (e.g., a minimum bounding rectangle) can bound text in one paragraph to represent a block. Information within the block may be associated by a relation (e.g., forming a section of or an entire paragraph, image, etc.). Further, the block type is based on the type(s) of information that the block contains and is not necessarily based on the actual content of the information. For example, if a bounded portion of a document contains text, that block can be referred to as a text block regardless of what that text may be. Similarly, if a bounded portion of a document contains an image, that block can be referred to as a non-text block.

As illustrated in FIG. 1, the layout 102 includes a plurality of blocks, including 104-108. Each of the blocks is represented by a minimum bounding rectangle and contains one type of information. More particularly, blocks 104 and 106 bound two paragraphs of the document 100 and may be referred to as text-blocks. In comparison, block 108 bounds an image of the document 100 and may be referred to as a non-text block. Similarly, the layout 152 of the document 150 also includes a plurality of blocks, including blocks 154-158, each of which bounds a paragraph or an image. As illustrated, the blocks 154 and 156 are text blocks and the block 158 is a non-text block.

The blocks illustrated in FIG. 1 are for illustrative purpose. In the interest of clarity of explanation, only three blocks from each document are used herein in the description. However, one or ordinary skill in the art would understand that the number, types, and arrangement of blocks vary with a document and that a layout comparison includes a comparison between some or all of the blocks.

Comparing the layouts 102 and 152 includes comparing the blocks 104-108 to the blocks 154-158. Techniques for comparing the blocks are further described in FIGS. 4 and 6. Briefly, these techniques involve computing, per block type, similarity metrics (e.g., distances) between the blocks 104-108 and the blocks 154-158, matching the blocks based on the computed metrics, and computing an overall similarity metric based on the similarity metrics of the matched blocks. Because the blocks may be matched differently (e.g., the text block 104 can be matched to the text block 154 or to the text block 156), a cost assignment function is implemented to minimize the cost associated with the matching. In an embodiment, the cost assignment function uses the computed similarity metrics to optimize the matching. Further, to determine if the layouts 102 and 152 and, thus, the documents 100 and 150 are similar, the techniques include comparing the overall similarity metric to a threshold.

As used herein, a "similarity metric" refers to a measure of how similar two components (e.g., blocks, layouts, documents) may be. A distance is an example of a similarity metric. As used herein, a "distance" refers to a mathematical description of how apart two components (e.g., blocks, layouts, documents) may be. In an embodiment, the distance can be inversely proportional to a similarity between the components, such as the greater the distance, the less similar the components may be.

In an illustrative example that uses distances, the blocks 108 and 158 are non-text blocks and, thus, are compared. In this case, the block 108 is associated with a distance to the block 158 (e.g., in this illustrative example, assume that the distance is "0.5"). No additional matching is necessary because another non-text block does not exist. Similarly, the blocks 104-106 are compared to the blocks 154-156 because these blocks are text blocks. As such, each of the blocks 104 and 106 can be matched to one of the blocks 154 and 156. Each of the potential matches is associated with two distances: one to the block 154 and one to the block 156. The cost assignment function selects a best match that minimizes the total distance. For example, if the individual distances between the block 104 and blocks 154 and 156 are "0" and "1," respectively, and if the individual distances between the block 106 and the blocks 154 and 156 are "1" and "0," respectively, matching the block 104 to the block 154 and the block 106 to the block 156 represents the best match. That is because, with such matching, the total distance is "0," whereas with the other possible match (e.g., the block 104 to the block 156 and the block 106 to the block 154), the total distance is "2." Once the blocks are matched, the overall distance can be the sum of the individual distances of the matched blocks. This overall distance may be referred to as a document distance. As such, in this illustrative example, the overall distance is "0+0+0.5=0.5." This overall distance can be compared to a threshold. If smaller than the threshold, the documents 100 and 150 are declared as having similar layouts.

Figure 2:
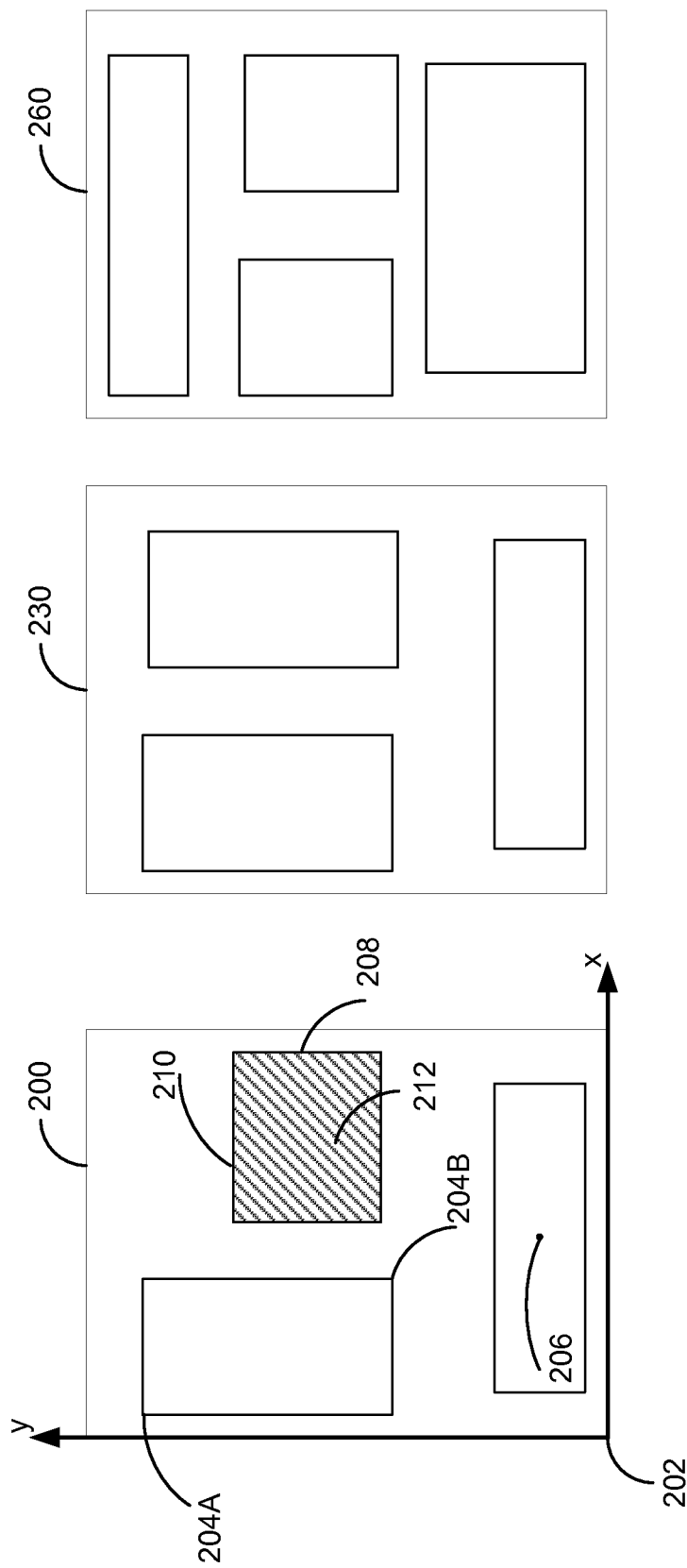
FIG. 2 illustrates an example comparison of layouts between documents, according to certain embodiments of the present invention.

Turning to FIG. 2, that figure illustrates an example comparison of document layouts. As illustrated, a layout 200 of a document is compared to layouts 230 and 260 of other documents to determine the similarities between the various layouts. In the interest of clarity of explanation, a comparison to two layouts is used as an example. However, the comparison can be to any other number of layouts. Also, in the interest of clarity of explanation, minimum bounding rectangles representing text and non-text blocks are used as examples in the comparison. However, the comparison can use other shapes, blocks, types of blocks, and number of shapes and blocks.

As illustrated in FIG. 2, to compare layouts, various properties of blocks are considered, such as geometric properties. These include, for example, the physical separation between blocks (e.g., the separation between the centers of the blocks, difference in height, width, and area of the blocks, extent of overlap when the blocks are superimposed, and the Manhattan distance or Euclidean distance between the corner points of the blocks. These various properties may be used to compute the similarity metrics.

In an embodiment, a similarity metric between two blocks $B_i$ and $B_j$ is represented using a distance $D(B_i, B_j)$. The distance $D(B_i, B_j)$ may be a function of the above properties. For example, the distance $D(B_i, B_j)$ may be a vector that represents differences between blocks $B_i$ and $B_j$. In another example, the distance $D(B_i, B_j)$ may be a weighted sum of the physical separation between blocks $B_i$ and $B_j$ ($d_{centers}(B_i, B_j)$), the difference in height, width, and area of the blocks $B_i$ and $B_j$ ($d_{diff-in-h,w,area}(B_i, B_j)$), and the Manhattan distance or Euclidean distance between the corner points of the blocks $B_i$ and $B_j$ ($d_{corners}(B_i, B_j)$). Further, the larger the extent of an overlap between blocks $B_i$ and $B_j$ (when superimposed) is, the more similar the blocks $B_i$ and $B_j$ may be. In other words, the smaller the distance should be. Thus, the distance $D(B_i,B_j)$ can also account for this inverse proportionality. In an example, the distance $D(B_i,B_j)$ is expressed as:

$$\frac{w_1 \times d_{centers}(B_i, B_j) + w_2 \times d_{corners}(B_i, B_j) + w_3 \times d_{diff-in-h,w,area}(B_i, B_j)}{1 + w_4 \times (\text{Percentage of overlap of superimposed } B_i \text{ and } B_j)}$$

The weights $w_1$, $w_2$, $w_3$, and $w_4$ represent adjustment factors that can depend on a context associated with the documents. An example context includes the size of and margins in a document. For instance, the context of an 8"×11" document is different from the context of an 11"×17" document. Thus, the weights used to determine distances for blocks in 8"×11" documents can differ from the weights used for a similar determination of 11"×17" documents. In an embodiment, the weights are derived empirically. For example, a set of known similar and dissimilar documents having a same context can be used to derive the weights. This may include using, for instance, a machine learning algorithm to output the weights. For example, if a machine learning algorithm is used, regression can be used to find the weights by applying a cross-validation method.

As shown in FIG. 2, the layouts 200, 230, and 260 share a common coordinate system 202 such as a Cartesian coordinate system with the origin centered at the bottom-left corner of each layout. Further, the properties of the blocks within the layouts 200, 230, and 260 are computed using this system 202. For example, top-left corners 204A, bottom-right corners 204B, centers 206 of the blocks are computed based on (x,y) coordinates. Similarly, heights 208, widths 210, areas 212 of the blocks and overlap between superimposed blocks are computed based on the (x,y) coordinates.

Comparing the layout 200 to the layouts 230 and 260 includes comparing the blocks in the layout 200 to the blocks in the layouts 230 and 260. Techniques for comparing the blocks are further described in FIGS. 4 and 6. Briefly, each block is labeled with an indication of a block type. For example, the blocks can be labeled as being text blocks (e.g., with a "T" indication) or non-text blocks (e.g., with a "N" indication). A layout "L" for a document "P" is defined as L(P)={T(P), N(P)}, where T(P) is the set of all text-blocks and N(P) is the set of all non-text blocks. In turn, T(P) and N(P) are defined as $\{t_1, t_2, \ldots, t_k\}$ and $\{n_1, n_2, \ldots, n_l\}$, respectively, where "k" and "l" are the number of text blocks and non-text blocks in the document, respectively. For each block "$t_i$" or "$n_i$" (commonly referred to as "$B_i$"), the corresponding geometric properties (e.g., corner points, center, height, width, area) are measured using the associated (x,y) coordinates. The measurements are repeated for various blocks across the documents. Subsequently, similarity metrics, such as $D(t_i,t_j)$ and $D(n_i,n_j)$ are computed. Because each block from the layout 200 can be matched to more than one block in the layout 230 or 260, a cost assignment function is implemented to select the best matches. This can result in a one-to-one matching between blocks from layouts 200 and 230 and a one-to-one matching between blocks from layouts 200 and 260. In an embodiment, the best matches correspond to matching blocks such that the total distance between the blocks (e.g., $\Sigma_{i=1,j=1}^{k,k} D(t_i,t_j)\Sigma_{i=1,j=1}^{l,l} D(n_i,n_j)$) is minimized. If blocks remain unmatched (e.g., as shown in FIG. 2, block 260 has an extra block that would remain unmatched), blocks of different types are matched or a penalty is imposed. Matching blocks of different types includes, for example, computing distances between the blocks of different types (e.g., $D(t_i,n_j)$ and $D(n_i,t_j)$) and applying the cost assignment function.

In an illustrative example, assume that the three blocks in the layout 200 are matched to the three blocks of the layout 230, where the respective distances between the matched blocks are "0", "0.25," and "0." Thus, the total distance between the two layouts 200 and 230 is "0.25." This total distance represents the similarity between the layouts 200 and 230. A degree of this similarity can be expressed as a function of the total distance. For example, on a scale of "1," the similarity degree can be set as "1—total distance" which equals "0.75" in this example. In other words, the layouts can be found to be 75% similar. In comparison, assume that the three blocks in the layout 200 are matched to three blocks of the layout 260 and that the remaining layout in block 260 remains unmatched. Also assume that the respective distances between the matched blocks are "0.5," "0," and "0.5" and that the penalty of the remaining unmatched block is "1." Thus, the total distance between the two layouts 200 and 260 is "2." Based on these computed distances, the layout 200 is more similar to the layout 230 than to the layout 260 because of the smaller total distance. Further, if the total distances are compared to a threshold (e.g., a threshold of a distance of "1"), the layouts 200 and 230 can be declared as being similar, whereas the layouts 200 and 260 can be declared as being dissimilar.

Hence, by segmenting documents into blocks of different types, measuring distances between the blocks based on the block types, matching the blocks based on a cost assignment function, and assessing penalties for unmatched blocks, total distance between layouts of documents are measured. The total distances indicate degrees of similarity between the layouts and can facilitate services that rely on layout similarities (e.g., clustering). Although numerical distances $D(B_i,B_j)$ is illustrated in FIG. 2, other types of distances and, more generally, of similarity metrics may be used. For example, vectors representing differences between blocks can be similarly used. In another example, the inverse of a distance can be also used.

Turning to FIGS. 3-6, those figures illustrate example flows for comparing layouts of documents. In the illustrative operations, each of the operations or functions may be embodied in, and fully or partially automated by, modules executed by one or more processors of a device hosting a layout comparison application. Example devices include a server device 730 hosting a layout comparison application 738 of FIG. 7 and a client device 700 hosting a layout comparison application 804 of FIG. 8. Also, while the operations are illustrated in a particular order, it should be understood that no particular order is necessary and that one or more operations may be omitted, skipped, and/or reordered. In the interest of clarity of explanation, the layout comparison application is described as performing the illustrative operations. Nevertheless, other or additional applications and modules of the device may be configured to implement one or more of the operations and/or one or more steps of the operations.

Figure 3:
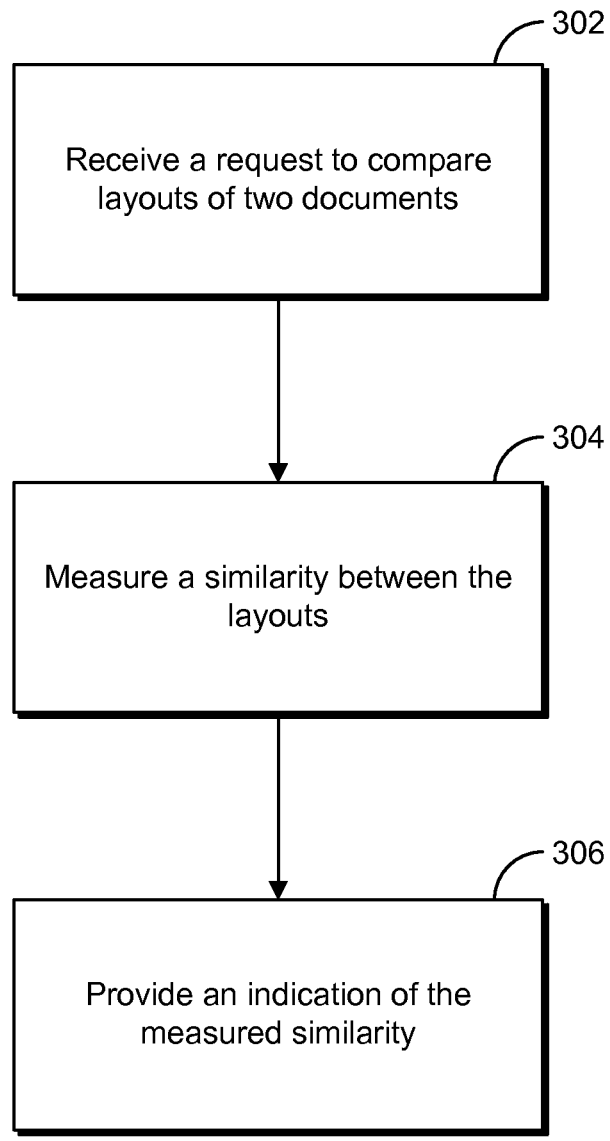
FIG. 3 illustrates an example flow for processing a request to compare layouts of documents, according to certain embodiments of the present invention.
Figure 4:
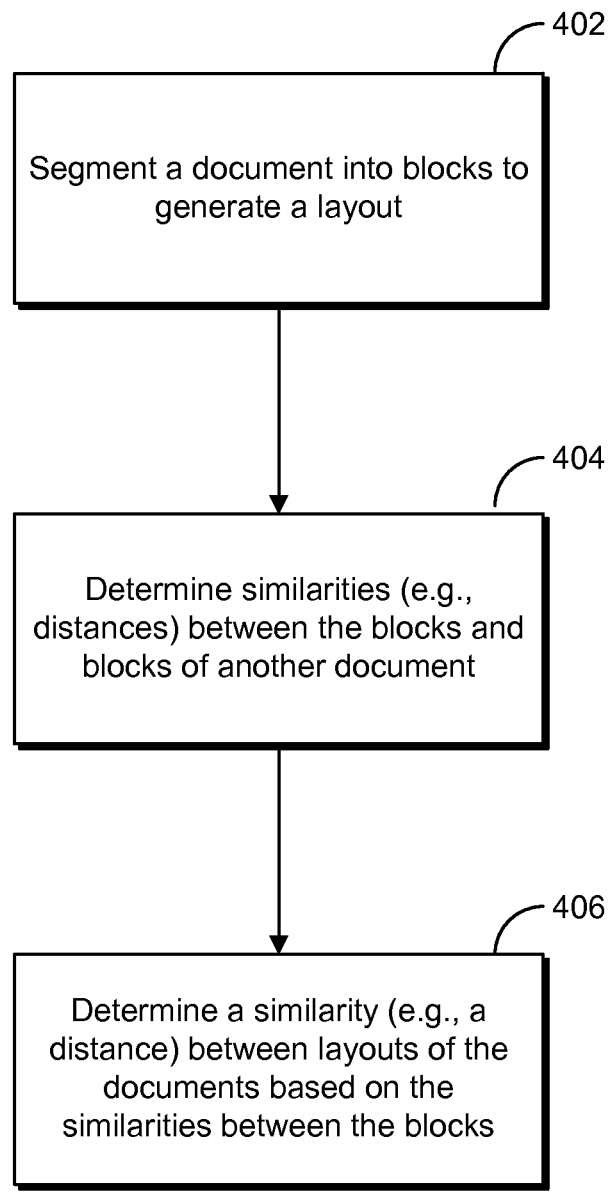
FIG. 4 illustrates an example flow comparing layouts of documents, according to certain embodiments of the present invention.
Figure 5:
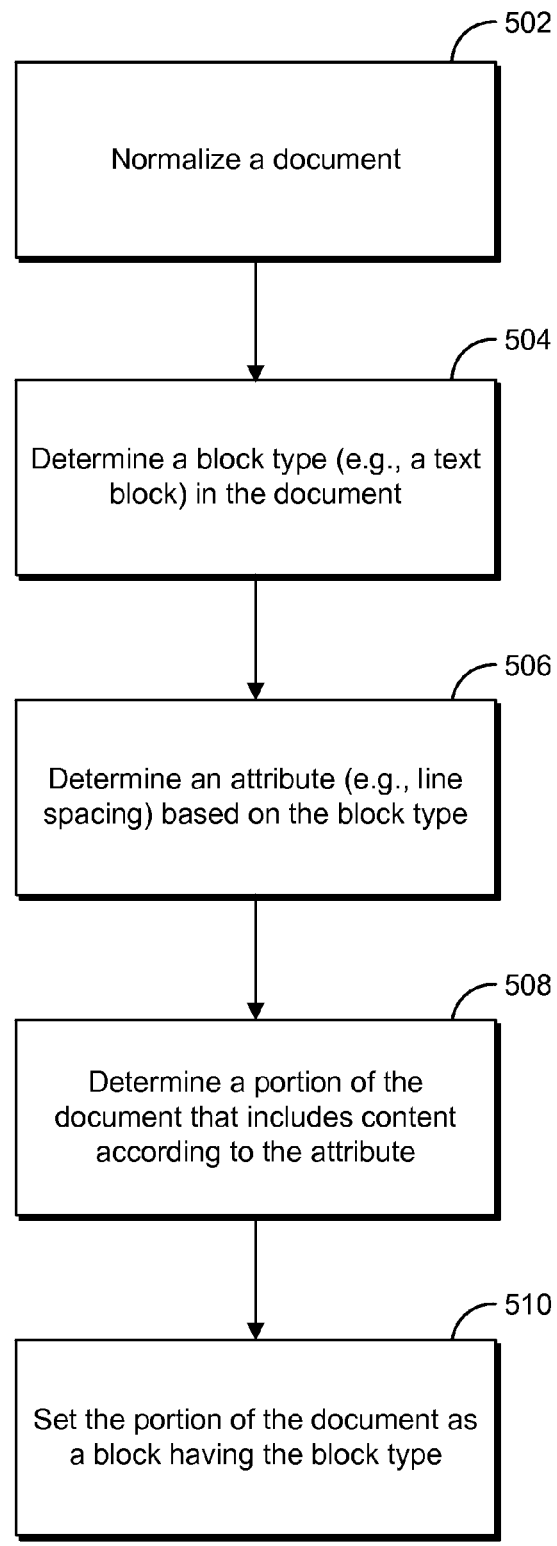
FIG. 5 illustrates an example segmenting a document into blocks to generate a layout, according to certain embodiments of the present invention.
Figure 6A:
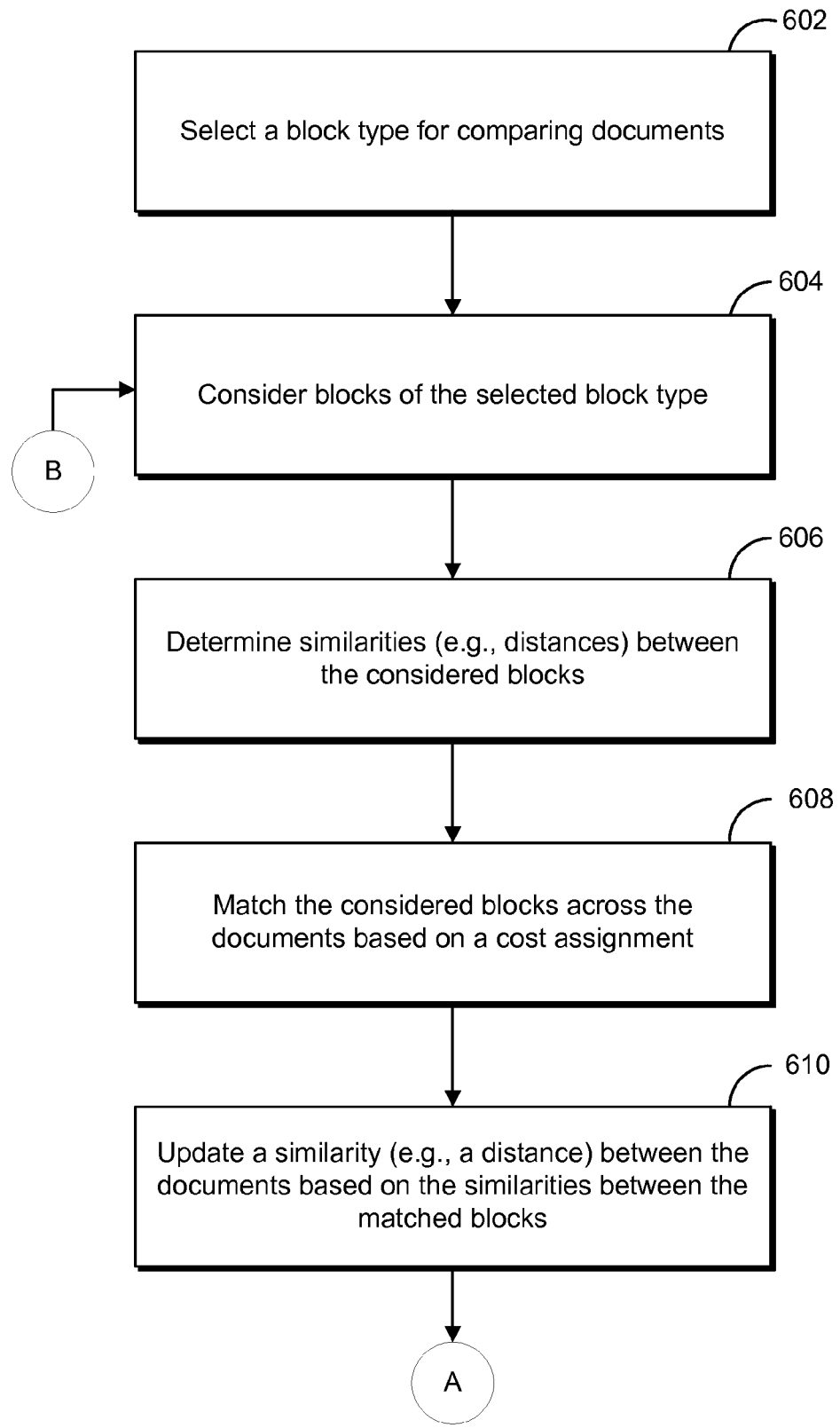
FIGS. 6A and 6B illustrate an example flow comparing and matching blocks of documents to measure a layout similarity, according to certain embodiments of the present invention.
Figure 6B:
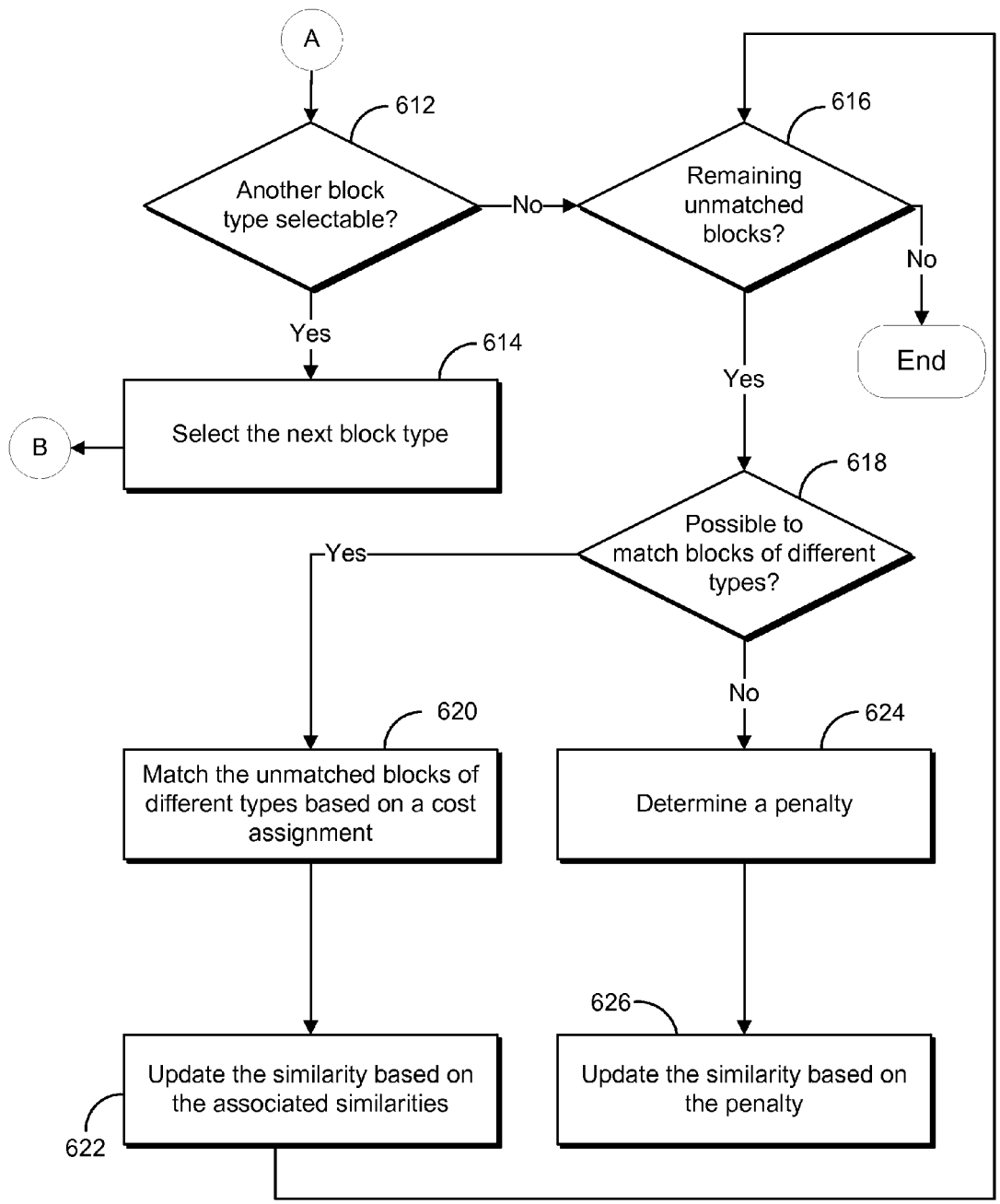

FIG. 3 illustrates an example flow for processing a request to compare layouts of documents. Operations of the example flow of FIG. 3 may be further embodied in operations of example flows of FIGS. 4-6. As such, some operations of the example flows of FIGS. 4-6 may be similar. Such similarities are not repeated herein in the interest of clarity of explanation. FIG. 4 illustrates an example flow for comparing the layouts, including segmenting documents into blocks, determining similarity metrics (e.g., distances) between the blocks, and determining a similarity metric (e.g., a total distance)

between the layouts. In comparison, FIG. 5 illustrates an example flow for segmenting the documents and FIGS. 6A and 6B illustrate an example flow for determining the similarity metrics.

Turning to FIG. 3, the example flow starts at operation 302, where the layout comparison application receives a request to compare layouts of documents. For example, the request may be received from a client device and may include or identify the documents.

At operation 304, the layout comparison application measures a similarity between the layouts. For example, if the documents are not already segmented, the layout comparison application segments the documents into blocks of different block types. Next, the layout comparison application measures similarity metrics, such as distances, between the blocks across the documents. Further, the layout comparison application matches the blocks by applying a cost assignment function that uses the similarity metrics and assesses penalties for blocks that could not be matched. Once the blocks are matched and penalties are assessed, the layout comparison application computes an overall similarity metric, such as a total distance, between the layouts. The overall similarity metric indicates how similar the layouts may be. This indication can include a quantitative assessment (e.g., "75%" similar). In an embodiment, the overall similarity metric is compared to a threshold to determine a qualitative assessment (e.g., if the metric is within a certain range of a threshold, the layouts may be declared to have a "good" similarity).

Various techniques can be implemented to derive a threshold. For example, a set of known similar and dissimilar documents can be compared and results can be used to determine the threshold. This may include using, for instance, a machine learning algorithm to output the threshold. Further, ranges of thresholds can be defined. For example, a distance between "0" and "0.25" (or some other range) can correspond to a "good" similarity. In comparison, a distance between "0.25" and "0.5" (or some other range) can correspond to an "acceptable" similarity. Otherwise, other distances can correspond to a "bad" similarity.

At operation 306, the layout comparison application provides an indication of the measured similarity. For example, the layout comparison application may provide a response in which various information about the similarity is included. As an example, the response can include the qualitative or the quantitative assessment. Additionally or alternatively, the response can include the compared documents, edited to show the matching blocks. Further, the response can involve clustering the documents according to the similarity and providing an identification of the cluster.

Turning to FIG. 4, that figure illustrates a more detailed flow for comparing layouts of documents. The example flow of FIG. 4 starts at operation 402, where the layout comparison application segments a document into blocks to generate a layout. For example, to compare the document to another document, the layout comparison application may segment one or both documents, as needed, to allow the comparison. Segmenting a document includes dividing the document into blocks of different types, such that the layout of the document can be expressed as a set of blocks. In an embodiment, segmenting a document "P" into text and non-text blocks results in a layout "L" expressed as $L(P)=\{T(P), N(P)\}$, where $T(P)$ is the set of all text-blocks and $N(P)$ is the set of all non-text blocks.

At operation 404, the layout comparison application determines similarities between the blocks of the document and the blocks of the other document. In an example, this may involve a multi-step process. First, the layout comparison application can determine, per block type, a similarity metric per pair of blocks across the documents. In an embodiment, this similarity metric can be commonly represented as $D(B_i, B_j)$ and may refer to one of $D(t_i,t_j)$ or $D(n_i,n_j)$, where "B" indicates a block, "t" indicates a text block, "n" indicates a non-text block, "i" indicates the first document, and "j" indicates the second document. Second, the layout comparison application can apply a cost assignment function that optimizes the matching of the blocks based on the computed similarity metrics. In an embodiment, the layout comparison application may implement a "Hungarian Algorithm" with improvements (e.g., the "Kuhn-Munkres Algorithm") using the distances $D(B_i,B_j)$. This algorithm may find the best matches (e.g., which $t_i$ should be matched to which $t_j$ and which $n_i$ should be matched to which $n_j$) based on minimizing the total distance (e.g., $\Sigma_{i=1,j=1}^{k,k'} D(t_i,t_j) + \Sigma_{i=1,j=1}^{l,l'} D(n_i,n_j)$).

At operation 406, the layout comparison application determines a similarity between the layouts of the documents based on the similarities between the blocks. In an example, this operation may involve a multi-step process and may be iteratively performed with operation 404. First, the layout comparison application can compute the similarity metric between the two documents based on the similarity metrics of the matched blocks. For example, the similarity metric may be the total distance that results from applying the cost assignment function. Second, the layout comparison application determines if there are blocks that remain unmatched. This can be the case for multiple reasons. One reason may be that the first document has more text blocks than the second document, while the second document has more non-text blocks than the first document (or vice-versa). In this case, the layout comparison application performs an operation similar to operation 404, except that the considered blocks are of different types (e.g., $D(t_i,n_j)$ and $D(n_i,t_j)$ are computed). The layout comparison application adds the resulting similarity metric (e.g., total distance) to the similarity metric determined in the first step. This can include using a multiplier (e.g., the added total distance is doubled or multiplied by some other factor) to account for the matching of different block types. Another reason may be that the first document has more text blocks and non-text blocks than the second document (or vice-versa). In this case, remaining blocks from the first document can no longer be matched to blocks in the second document (e.g., because all of the blocks in the second documents have already been matched). To account for the remaining unmatched blocks, the layout comparison application may assess and add a penalty to the similarity metric determined in the first step.

Turning to FIG. 5, that figure illustrates an example flow for segmenting a document based on various block types. The operations of the example flow of FIG. 5 can be implemented as steps of operation 402 of FIG. 4. Further, some or all of the operations of the example flow of FIG. 5 may implement segmentation techniques described in application Ser. No. 13/800,242 entitled "Method and Apparatus for Identifying Local Blocks of Text in a Document," filed on Mar. 13, 2013, the full disclosure of which is incorporated herein by reference.

The example flow of FIG. 5 starts at operation 502, where the layout comparison application normalizes a document. Typically, the layout comparison application compares documents of a same size and orientation. Otherwise, the accuracy of the comparison may deteriorate. Thus, normalizing the document involves a number of operations. For example, the normalizing can involve resizing the document to a common size usable for comparison purposes. Normalizing can also include de-skewing the document if, for example, the document is a scanned document, rotating the document (e.g., into a portrait orientation), and other operations.

At operation 504, the layout comparison application determines a block type in the document. As described herein above, portions of a document can be divided into blocks of different types based on the type of information that each portion contains. Generally, there are text blocks, non-text blocks, and other types of blocks. Additional granularity can be achieved by further defining sub-types for the blocks. Example sub-types include paragraph blocks, header blocks, footer blocks, image blocks, chart blocks, table blocks, and other sub-types.

To determine a block type in the document, the layout comparison application may implement various techniques. In one technique, if the document structure information is available, the layout comparison application parses that information and selects a block type accordingly. For example, when the document structure information indicates a paragraph, the layout comparison application selects a text block type. In another technique, if the document structure information in not available, the layout comparison application applies an optical character recognition (OCR) operation to the document. Based on the result of the OCR application, the layout comparison application selects the block type accordingly. For example, if the OCR results indicate that the document contains words, the layout comparison application selects the text block type.

At operation 506, the layout comparison application determines an attribute based on the block type. The attribute is usable to analyze and identify the blocks of the document that belong to the selected block type. As such, the attribute depends on the block type. For example, for text-blocks, an attribute can be line spacing. In comparison, for non-text blocks, an attribute can be color mapping.

Determining a value of the attribute may depend on whether the document structure information is available. If so, the value can be retrieved from this information. Otherwise, the value can be retrieved from an analysis of the document. For example, for text-blocks, the layout comparison application can perform multiple steps. First, individual characters are identified. Second, words based on contexts of the characters (e.g., spacing, punctuation, etc.) are recognized. Third, words are combined in a line based on contexts of the words (e.g., gaps between words, relative horizontal positions, punctuation, etc.). Fourth, spacing between lines (e.g., vertical line spacing, etc.) is computed. Fifth, the average line spacing is computed by averaging the computed line spacing. The computation in these steps can be based on a (x,y) coordinate system similar to the one described in FIG. 2. A similar analysis can be applied to non-text blocks to compute an average color mapping.

At operation 508, the layout comparison application determines a portion of the document that includes content according to the attribute. The content can be text or non-text. An additional level of granularity can also be applied (e.g., paragraphs, headers, footers, etc.). This operation allows the layout comparison application to set that portion as a block of the selected block type.

For example, if line spacing is considered, the layout comparison application computes spacing between two adjacent lines. If the spacing exceeds the average line spacing by a certain factor, the layout comparison application determines that the two lines belong to different text blocks. Otherwise, the two lines belong to the same text block. This computation is iteratively repeated across the various lines to determine the various text portions that should correspond to the respective text blocks. In another example, if color mapping is considered, the layout comparison application determines non-text portions by applying an edge detection algorithm accordingly. The resulting non-text portions should correspond to non-text blocks.

At operation 510, the layout comparison application sets the portion of the document as a block of the selected block type. Generally, this operation includes bounding the portion with a minimum bounding shape, such as a minimum bounding rectangle, along the edges. The minimum bounding shape is associated with properties, such as corner coordinates, center coordinates, height, width, and area, that can be computed from the (x,y) coordinate system. The minimum bounding shape along with the properties can represent the block.

Hence, by segmenting a document into blocks, the layout comparison application can generate a layout that distinguishes between different block types and that includes properties usable in computing similarity metrics. For example, the layout comparison application can define a layout "L" for a document "P" as $L(P)=\{T(P), N(P)\}$. $T(P)$ and $N(P)$ can represent a set of all text-blocks and a set of all non-text blocks, respectively. The elements of the sets $T(P)$ and $N(P)$ can have properties computed according to the (x,y) coordinate system.

Turning to FIGS. 6A and 6B, those figures illustrate an example flow for computing similarity metrics between blocks across documents. The operations of the example flow of FIGS. 6A and 6B can be implemented as steps of operations 404 and 406 of FIG. 4. Generally, the layout comparison application matches blocks of a same type across the documents and computes the similarity metrics accordingly. However, and as further illustrated in FIG. 6B, not all the blocks of a same type may be matched. In that case, the layout comparison application matches blocks of different types across the documents, computes the similarity metrics, and/or determines penalties. The overall similarity metric between the documents depend on the computed similarity between the matched blocks and the computed penalties.

The example flow of FIG. 6A starts at operation 602, where the layout comparison application selects a block type for comparing documents. For example, if the corresponding layouts include text and non-text blocks, the layout comparison application may start the similarity comparison by comparing the text blocks (or, alternatively the non-text blocks). One of ordinary skill in the art would recognize that the comparison need not be sequential and can be performed in parallel. In other words, the layout comparison application can compare the text blocks, also in parallel, comparing the non-text blocks.

At operation 604, the layout comparison application considers blocks of the selected block type. For example, if the selected type is for text blocks, the layout comparison application analyzes the similarity of the text blocks across the two documents.

At operation 606, the layout comparison application determines similarities between the considered blocks. For example, the layout comparison application can compute similarity metrics between the considered blocks from the first document and the considered blocks from the second document. In an embodiment, the layout comparison application computes distances between the blocks, such as $D(B_i, B_j)$ as described herein above.

At operation 608, the layout comparison application matches the considered blocks across the documents based on a cost assignment. The cost assignment can include a function that optimizes the overall similarity between the documents by determining the best matches between the blocks. For example, a cost assignment function can be applied to maximize the similarity metrics between the considered block. In an embodiment, a "Hungarian Algorithm" with improvements (e.g., the "Kuhn-Munkres Algorithm") is applied using the distances $D(B_i,B_j)$. This algorithm may find the best matches based on minimizing the total distance (e.g., $\Sigma(B_i,B_j)$, Where $B_i$ and $B_j$ are blocks of the same type).

At operation 610, the layout comparison application updates a similarity between the documents based on the similarities between the matched blocks. For example, a predefined default similarity may be updated with the overall similarity between the documents. In an embodiment, a default distance can be used (e.g., "0" or some other value). As the blocks are matched, the layout comparison application cumulatively sums the total distance and the default distance (e.g., $D_{total}=D_{total}\Sigma D(B_i,B_j)$). As indicated in the bubble "A" of FIGS. 6A and 6B, operation 610 may be followed by operation 612 of the example flow of FIG. 6B.

At operation 612, the layout comparison application determines whether another block type is selectable. In other words, this operation ensures that some or all of the available block types are selected and analyzed. If another block type is selectable, the layout comparison application performs operation 614, where the next block type is selected. Otherwise, the layout comparison application performs operation 616.

At operation 614, layout comparison application selects the next block type. For example, if text blocks were previously analyzed, the layout comparison application selects non-text blocks and re-performs the operations 604-610. This iteration is illustrated in FIGS. 6A and 6B with the bubble "B."

At operation 616, the layout comparison application determines whether a number of blocks remain unmatched. At this operation, the layout comparison application has already computed the similarity between blocks of the same types. However, there may blocks that remain unmatched for multiple reasons (e.g., left-over blocks). For example, the number of blocks per block type may vary between documents (e.g., $|T(P_1)|\neq|T(P_2)|$ and/or $|N(P_1)|\neq|N(P_2)|$, where "$P_1$" and "$P_2$" represent the compared documents). Also, to find the best matches, the cost assignment function may result in a one-to-one matching between blocks from the two documents. Thus, left-over blocks of one type from one document cannot be matched to blocks of the same type from the other document.

If there are no left-over blocks, the example flow of FIG. 6B ends. The resulting overall similarity between the documents is the similarity determined at operation 610. Otherwise, the layout comparison application performs remaining operations of the example flow of FIG. 6B.

At operation 818, the layout comparison application determines whether it is possible to match blocks of different types. If so, operation 620 may follow operation 618. Otherwise, operation 624 may follow operation 618. Blocks of different types can be matched when, for example, $|T(P_1)|\geq|T(P_2)|$ and $|N(P_1)|\leq|N(P_2)|$ or $|T(P_1)|\leq|T(P_2)|$ and $|N(P_1)|\geq|N(P_2)|$. That is because, if text blocks are left-over in the first document and non-text blocks are left-over in the second document (or vice versa), the layout comparison application can match the left-over blocks of different types across the documents. Conversely, blocks of different types cannot be matched when, for example, $|T(P_1)|\geq|T(P_2)|$ and $|N(P_1)|\geq|N(P_2)|$ or $|T(P_1)|\leq|T(P_2)|$ and $|N(P_1)|\leq|N(P_2)|$. That is because all of the blocks in one document have already been matched and are no longer available for matching with left-over blocks in the other document.

At operation 620, the layout comparison application matches the unmatched left-over blocks of different types based on a cost assignment. This operation may be similar to operations 606 and 608 of FIG. 6A, except that the compared blocks are of different types (e.g., the computed distances correspond to $D(t_i,n_j)$ and $D(n_i,t_j)$ rather than $D(t_i,t_j)$ and $D(n_i,n_j)$). Operation 620 results in determining similarities (e.g., similarity metrics such as distances) between the matched left-over blocks of different types.

At operation 622, the layout comparison application updates the similarity between the two documents from operation 610 with the similarities determined at operation 620. For example, the similarity metrics of the matched left-over blocks can be added to the overall similarity metric from operation 610. Because the update is associated with a match of dissimilar blocks, such as blocks of different types, the layout comparison application can include a factor to reflect this type of dissimilarity. In an embodiment, the layout comparison application multiplies the distances of the matched left-over blocks by a factor "f" (e.g., "2" or some other multiplier) and sums the multiplied distances with the total distance from operation 610. As such, the updated total distance between the documents can be expressed as $D_{total}=D_{total}+f\times\Sigma D(B_i,B_j)$, where $B_i$ and $B_j$ are blocks of different types and "f" is a multiplier.

Operation 622 may be followed by operation 616. In other words, the layout comparison application further determines if there are any left-over blocks. If so, the layout comparison application tries to match these left-over blocks with left-over blocks of other types. But if that matching is no longer possible, the layout comparison application proceeds to determine a penalty as illustrated in operation 624.

At operation 624, the layout comparison application determines a penalty that can be used to update the similarity between the document. The penalty reflects the situation that at operation 624, a number of blocks remain unmatched and cannot be matched. In other words, this situation indicates that the layouts of the documents contain blocks that cannot be matched and, thus, should be found dissimilar.

The layout comparison application computes a penalty per type of blocks that remain unmatched. In other words, if there are left-over text blocks, a text block penalty is computed. Similarly, if there are left-over non-text blocks, a non-text block penalty is computed. Generally, the penalty can be an additional similarity metric configured to indicate dissimilarity. For example, the penalty can be a predefined or a computed distance. In an embodiment, the penalty is computed as: penalty=max(Number of unmatched blocks on a document×average distance of blocks on the document×proportion of the area on the document of the unmatched blocks, Number of the unmatched blocks×minimum penalty). The minimum penalty can be derived empirically. For example, a set of known similar and dissimilar documents can be used to compute the minimum penalty. This may include using, for instance, a machine learning algorithm.

Once the penalty is determined, the layout application updates the total distance accordingly. For example, the penalty can be added to the overall similarity metric between the two documents. In an embodiment, this update is expressed as $D_{total}=D_{total}+$penalty.

Hence, by performing the example flows of FIGS. 6A and 6B, the layout comparison application can compute the similarity between documents based on the corresponding layouts. This computation takes into account the structure of the layouts by distinguishing between the various types of blocks. In particular, the computation assesses a similarity based on matched blocks of the same type, a similarity based on matched left-over blocks of different types, and a penalty for remaining blocks that could not be matched. This granularity in the computation allows the layout comparison application to accurately measure how similar or dissimilar the layouts may be.

Figure 7:
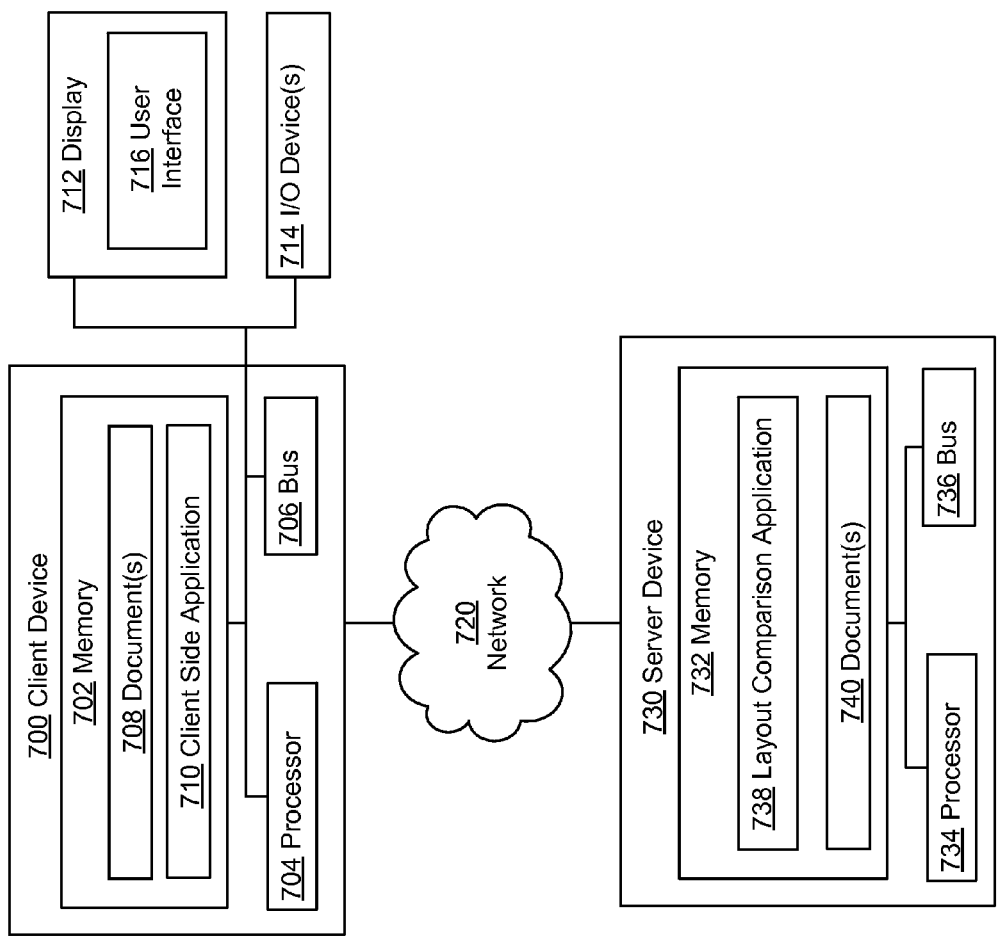
FIG. 7 illustrates an example computing environment for comparing documents, according to certain embodiments of the present invention.
Figure 8:
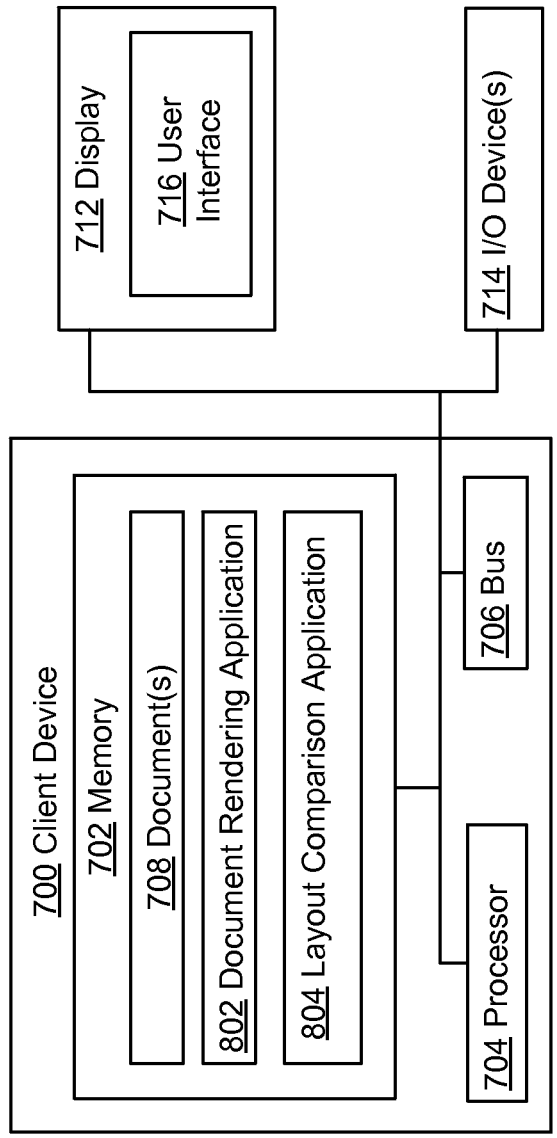
FIG. 8 illustrates another example computing environment for comparing documents, according to certain embodiments of the present invention.

Turning to FIG. 7, that figure illustrates an example computing environment for comparing documents based on the respective layouts. In particular, the computing environment includes a client-server architecture, where a client device 700 communicates with a server device 730 over a network 720 to compare documents. The client device 700 can submit requests to the server device 730 identifying documents for comparison. In response, the server device 730 can process the request, compare the similarity of the documents based on the corresponding layouts, and return an indication of the similarity to the client device 700.

The methods, computer readable media, and systems disclosed herein are also applicable on other computing systems and environments. The environment shown in FIG. 7 includes wired or wireless networks 720 connecting various devices 700 and 730. In one embodiment, the network 720 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 700 and 730 are respectively used as special purpose computing devices to provide specific functionality offered by their respective applications and by the interaction between their applications. As an example, the client device 700 is shown with a display 712 and various input/output devices 714. A bus, such as bus 706 and bus 736, will typically be included in a device as well.

As used herein, the term "server" refers to an application that listens for or otherwise waits for requests or a device that provides one or more such applications that listens for or otherwise waits for requests. The server device 730 is an example of a server. A "server device" may be used to facilitate comparison of documents based on the respective layouts.

In an embodiment, to compare layouts of documents, the client device 700 includes a client side application 710 and the server device 730 includes a layout comparison application 738. The two applications can be implemented in conjunction such that, the client device 700 can execute the client side application 710 to request a layout comparison and such that the server device 730 executes the layout comparison application 738 to compare the document based on the corresponding layouts.

As used herein, the term "application" refers to any program instructions or other functional components that execute on a device. An application may reside in the memory of a device that executes the application. As is known to one of skill in the art, such applications may reside in any suitable computer-readable medium and execute on any suitable processor. For example, as shown the devices 700 and 730 each have a computer-readable medium such as memory 702 and 732 coupled to a processor 704 and 734 that executes computer-executable program instructions and/or accesses stored information. Such processors 704 and 734 may comprise a microprocessor, an ASIC, a state machine, or other processor, and can be any of a number of computer processors. Such processors include, or may be in communication with, a computer-readable medium which stores instructions that, when executed by the processor, cause the processor to perform the operations described herein.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The layout comparison application 738 compares layouts of documents for similarity and provides an indication of the similarity to the client side application 710. Compared documents may reside on one or both devices 700 and 730 or on another device or storage accessible to the client device 700 or the server device 730 over the network 720. In an embodiment, documents 708 are stored in the memory 702 of the client device 700. To request a comparison, the client device 700 includes the documents in a request to the server device 730. In another embodiment, documents 740 are stored in the memory 732 of the server device 730. To request a comparison, the client device 700 identifies the documents 740 in the request to the server device 730. In yet another embodiment, documents 708 and documents 740 are stored in the memory 702 and 732 of the client device 700 and the server device 730, respectively. In this embodiment, the request from the client device 700 includes one or more of documents 708 and identifies one or more of documents 740 for comparison.

To facilitate interactions with a user, the client side application 710 or another application stored in the memory 702 may support a user interface 716. The user interface can be displayed to the user on the display 712 connected to the client device 700. By operating the I/O devices (e.g., a keyboard and a mouse) 714, the user can request via the user interface 716 a documents comparison. In turn, the client side application 710 can process and transmit this request to the layout comparison application 738. Further, the client side application 710 receives a response from the layout comparison application 738 and displays the response or information based on the response at the user interface 716. For example, the client side application 710 may display a qualitative or a quantitate assessment of the similarity (e.g., the layouts of the two documents have a "good" similarity, or the layouts of the two documents are "95%" similar). In another example, the client side application 710 can display the compared documents in conjunction and can highlight matching blocks. For instance, the compared documents can be displayed side-by-side on the user interface 716, while the matching blocks can be color-coded, numbered, or identified accordingly.

In addition to comparing layouts of documents for similarity, the computing environment of FIG. 7 can support other services. In an embodiment, these services include additional applications that use the results of layout comparisons. For example, the server device 730 may host a clustering application (not shown in FIG. 7), which clusters documents that have a similar layout in a same cluster. In an embodiment, this clustering application may be integrated with the layout comparison application 738. In another embodiment, the clustering application may be separate from, but may interface with the layout comparison application 738 and the client side application 710. In another example, the server device 730 may host an interface (e.g., an application programming interface—API) that a third party may use to extend services to the client device 700. The third party, a phone company for instance, can operate a third party device to submit documents, which may be in the thousands or millions, on a regular basis to the server device 730. In turn, the server device 730 may cluster the documents in clusters based on the similarities of the respective layouts. For instance, phone bills can be clustered in one group, whereas advertisements of phone services can be clustered in another group. The client side application 710 can allow a user to subscribe to one or more of the clusters. For instance, the user can opt to receive only phone bills and to filter out advertisements.

Turning to FIG. 8, that figure illustrates another example computing environment for comparing layouts of documents. Unlike the client-server architecture of FIG. 7, the computing environment of FIG. 8 includes a client device that locally compares documents. In particular, the computing device 700 of FIG. 8 can be configured to compare the documents without interacting with the server device 730.

As illustrated in FIG. 8, the memory 702 includes a document rendering application 802 and a layout comparison application 804. The document rendering application 802 is configured to render the documents 708 stored in the memory 702 at the user interface 716. For example, the document rendering application 802 can be an application such as ADOBE® ACROBAT®, a MICROSOFT® OFFICE® application, a GOOGLE® DOCS® application, or another document rendering application. The layout comparison application 804 is configured to compare the documents 708 for layout similarities. The operation of the layout comparison application 804 may be similar to that of the layout comparison application 738 of FIG. 7.

In an embodiment, the layout comparison application 804 can be integrated with the document rendering application 802 (e.g., a module within, a plug-in extension, or another type of integration in the document rendering application 802). In another embodiment, the layout comparison application 804 can be separate from, but can interface with the document rendering application 802. For example, when a document is rendered on the user interface 716, the document rendering application 802 can display a menu option for layout comparison. If that option is activated, the document rendering application 802 interfaces with the layout comparison application 804 to compare the document to another document.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method comprising:
   segmenting a first document into first blocks and a second document into second blocks, each of the first blocks and second blocks representing a respective contiguous document portion comprising information associated by a relation;
   computing, by a processor, distances between the first blocks and the second blocks, wherein the distances are indicative of similarities between the first blocks and the second blocks;
   matching the first blocks to the second blocks to minimize the distances; and
   computing, by the processor, a document distance between the first document and the second document based on the distances between the matched first blocks and the second blocks, wherein the document distance is indicative of a similarity between the first document and the second document.

2. The computer-implemented method of claim 1 further comprising:
   identifying a block type for each of the first blocks and second blocks; and
   computing the distances between first blocks and second blocks by only computing distances between blocks having a same respective block type.

3. The computer-implemented method of claim 1, wherein computing the distances between the first blocks and the second blocks comprises calculating one or more distances:
   (a) between centers of a first block and a second block;
   (b) between corner points of the first block and the second block;
   (c) based on differences in heights of the first block and the second block;
   (d) based on differences in widths of the first block and the second block;
   (e) based on differences in areas of the first block and the second block; and
   (f) an amount of overlap between the first block and the second block.

4. The computer-implemented method of claim 1, wherein computing the distances between the first blocks and the second blocks comprises:
   selecting properties of the first blocks and second blocks from available properties; and
   computing the distances based on the selected properties, wherein the distances comprise a first distance computed based on a first property and a second distance computed based on a second property.

5. The computer-implemented method of claim 1, wherein computing the document distance between the first document and the second document comprises summing the distances between the first blocks and the second blocks based on weights associated with the distances.

6. The computer-implemented method of claim 1, wherein computing the distances between the first blocks and the second blocks comprises comparing blocks based on block type, the comparing comprising:
   comparing first blocks of a text block type only with second blocks of the text block type; and
   comparing first blocks of a non-text block type only with second blocks of the non-text block type.

7. The computer-implemented method of claim 1, wherein matching the first blocks to the second blocks comprises:
   matching text blocks from the first blocks and the second blocks based on a first cost assignment, wherein the first cost assignment minimizes a total distance between the text blocks;
   matching non-text blocks from the first blocks and second blocks based on a second cost assignment, wherein the second cost assignment minimizes a total distance between the non-text blocks; and
   computing the distances between the first blocks and the second blocks based on individual distances between the matched text blocks and individual distances between the matched non-text blocks.

8. The computer-implemented method of claim 1, wherein matching the first blocks to the second blocks comprises:
   matching text blocks from the first blocks and the second blocks;
   matching non-text blocks from the first blocks and second blocks;
   determining that text blocks from the first blocks remain;
   determining that non-text blocks from the second blocks remain unmatched;
   matching the unmatched text blocks to the unmatched non-text blocks based on a cost assignment, wherein the cost assignment minimizes a total distance between the unmatched text blocks and the unmatched non-text blocks; and
   computing the distances between the first blocks and the second blocks based on individual distances between the matched text blocks, individual distances between the matched non-text blocks, and individual distances associated with the matching of the unmatched text blocks and unmatched non-text blocks.

9. The computer-implemented method of claim 1, wherein matching the first blocks to the second blocks comprises:
   matching text blocks from the first blocks and the second blocks;
   matching non-text blocks from the first blocks and second blocks;
   computing a penalty for unmatched text blocks or non-text blocks; and
   computing the distances between the first blocks and the second blocks based on individual distances between the matched text blocks, individual distances between the matched non-text blocks, and the penalty.

10. The computer-implemented method of claim 1, matching the first blocks to the second blocks comprises:
    matching text blocks from the first blocks and the second blocks;
    matching non-text blocks from the first blocks and second blocks;

determining that text blocks and non-text blocks from the first blocks remain unmatched;

computing a first penalty for the unmatched text blocks and a second penalty for the unmatched non-text blocks; and computing the distances between the first blocks and the second blocks based on individual distances between the matched text blocks, individual distances between the matched non-text blocks, and the first penalty and the second penalty.

11. The computer-implemented method of claim 1, wherein segmenting the first document into the first blocks comprise:

identifying lines of text in the first document;

setting a portion of the first document that contains a subset of less than all of the lines of text as a paragraph block based on spacing between the lines of text.

12. The computer-implemented method of claim 1, wherein segmenting the first document into the first blocks comprises setting a portion of the first document that contains an image as an image block.

13. A system comprising:

a processor;

a memory communicatively coupled to the processor and bearing instructions that, upon execution by the processor, cause the system to at least:

divide a document into blocks, wherein the blocks indicate a layout of the document;

compute similarity metrics of the blocks relative to blocks of another document, wherein the similarity metrics are based on properties of the blocks;

match the blocks of the document to the blocks of the other document based on the similarity metric; and compute a document similarity metric of the document relative to the other document based on the similarity metrics of the matched blocks, wherein the document similarity metric indicates a similarity between the layout of the document and a layout of the other document.

14. The system of claim 13, wherein the blocks have a geometric shape, and wherein the properties are based on the geometric shape and comprise one or more of: centers, heights, widths, areas, or amounts of overlap of the blocks.

15. The system of claim 13, wherein the instructions, upon execution by the processor, further cause the processor to:

compare the similarity metric to a threshold; and determine whether the document and the other document have similar layouts based on the comparison.

16. The system of claim 15, wherein the instructions, upon execution by the processor, further cause the processor to:

cluster the document in a same cluster as the other document when the similarity metric is smaller than the threshold.

17. The system of claim 15, wherein the instructions, upon execution by the processor, further cause the processor to:

receive a request from a computing device of a client to compare layouts of documents, wherein the request identifies the document;

determine that the similarity metric is smaller than the threshold; and provide an indication that the layout of the document is similar to the layout of the other document to the computing device.

18. A non-transitory computer-readable storage medium storing instructions that, when executed on a computing device, configure the computing device to perform operations comprising:

segmenting a first document into first blocks and a second document into second blocks, each of the first blocks and second blocks representing a respective contiguous document portion comprising information associated by a relation;

calculating distances between the first blocks and second blocks of a second document based on properties of the first blocks and the second blocks;

matching the first blocks to the second blocks to minimize the distances; and calculating a document distance between the first document and the second document based on the distances between the matched first blocks and the second blocks, wherein the document distance is associated with a similarity between layouts of the first document and the second document.

19. The non-transitory computer-readable storage medium of claim 18, wherein the operations further comprising:

determining that the first document and the second document have a similar layout based on the distance between the first document and the second document.

20. The non-transitory computer-readable storage medium of claim 18, wherein the operations further comprising:

providing an interface for displaying the first document and the second document in conjunction; and displaying the first document and the second document on the interface with indications of matched blocks from the first blocks and the second blocks based on the distances between the first blocks and the second blocks.

\* \* \* \* \*